US009062582B2

(12) United States Patent
Loman et al.

(10) Patent No.: US 9,062,582 B2
(45) Date of Patent: Jun. 23, 2015

(54) EXHAUST POST-TREATMENT DEVICE AND METHOD FOR A VEHICLE, WITH A REDUCTANT VAPORISING SURFACE BEING WARMED BY A PELTIER ELEMENT

(75) Inventors: Peter Loman, Sollentuna (SE); Ola Hall, Stockholm (SE); Daniel Ryrfeldt, Hägersten (SE)

(73) Assignee: SCANIA CV AB (SE)

( * ) Notice: Subject to any disclaimer, the term of this patent is extended or adjusted under 35 U.S.C. 154(b) by 78 days.

(21) Appl. No.: 13/879,634

(22) PCT Filed: Oct. 18, 2011

(86) PCT No.: PCT/SE2011/051244
§ 371 (c)(1),
(2), (4) Date: May 9, 2013

(87) PCT Pub. No.: WO2012/064253
PCT Pub. Date: May 18, 2012

(65) Prior Publication Data
US 2013/0232956 A1 Sep. 12, 2013

(30) Foreign Application Priority Data

Nov. 8, 2010 (SE) ........................................ 1051161

(51) Int. Cl.
*F01N 3/00* (2006.01)
*F01N 3/18* (2006.01)
*F01N 3/20* (2006.01)

(52) U.S. Cl.
CPC *F01N 3/18* (2013.01); *F01N 3/206* (2013.01); *F01N 2240/02* (2013.01);

(Continued)

(58) Field of Classification Search
USPC ............ 60/274, 275, 286, 295, 300, 301, 303
See application file for complete search history.

(56) References Cited

U.S. PATENT DOCUMENTS 6,986,247 B1 * 1/2006 Parise .............................. 60/284
7,687,704 B2 * 3/2010 Shimoji et al. ................. 136/205
(Continued)

FOREIGN PATENT DOCUMENTS

DE           100 41 955 A1    3/2002
EP   DE 10 2007 058 768 A1    6/2009
(Continued)

OTHER PUBLICATIONS

International Search Report dated Feb. 3, 2012 issued in corresponding International patent application No. PCT/SE2011/051244.
(Continued)

*Primary Examiner* — Binh Q Tran
(74) *Attorney, Agent, or Firm* — Ostrolenk Faber LLP

(57) ABSTRACT

An exhaust post-treatment device (2) for a vehicle (4) for reducing nitrogen oxides present in the exhaust gases (20) of the vehicle (4) by supply of liquid reducing agent (18) to the exhaust gases (20) in an exhaust pipe (32). The device (2) locally warms a surface (31) within the exhaust pipe (32) by a Peltier element (6) by using thermal energy from the exhaust gases (20) to vaporize liquid reducing agent (18) which reaches the surface (31), thereby avoiding the formation of deposits of reducing agent within the exhaust pipe (32). Also a method for post-treatment of exhaust gases from vehicles with an exhaust post-treatment device (2) including a Peltier element (6).

12 Claims, 5 Drawing Sheets

(52) U.S. Cl.
CPC ...... *F01N 2610/02* (2013.01); *F01N 2610/102* (2013.01); *F01N 3/2066* (2013.01); *F01N 2240/16* (2013.01); *Y02T 10/24* (2013.01)

(56) References Cited

U.S. PATENT DOCUMENTS

| | | | | |
|---|---|---|---|---|
| 7,921,640 | B2* | 4/2011 | Major | 60/320 |
| 8,407,990 | B2* | 4/2013 | Bruck et al. | 60/295 |
| 2005/0204733 | A1 | 9/2005 | Sasaki | |
| 2009/0120078 | A1* | 5/2009 | Bruck et al. | 60/299 |
| 2009/0139207 | A1* | 6/2009 | Reiners et al. | 60/274 |
| 2009/0178393 | A1 | 7/2009 | Norsk et al. | |

FOREIGN PATENT DOCUMENTS

| | | |
|---|---|---|
| EP | 2 078 834 A1 | 7/2009 |
| FR | 2 925 583 A3 | 6/2009 |
| WO | WO 2005/073528 A1 | 8/2005 |

OTHER PUBLICATIONS

International Preliminary Report on Patentability dated Feb. 7, 2013 issued in corresponding International patent application No. PCT/SE2011/051244.

* cited by examiner

EXHAUST POST-TREATMENT DEVICE AND METHOD FOR A VEHICLE, WITH A REDUCTANT VAPORISING SURFACE BEING WARMED BY A PELTIER ELEMENT

CROSS-REFERENCE TO RELATED APPLICATIONS

The present application is a 35 U.S.C. §§371 national phase conversion of PCT/SE2011/051244, filed Oct. 18, 2011, which claims priority of Swedish Application No. 1051161-6, filed Nov. 8, 2010, the contents of which are incorporated by reference herein. The PCT International Application was published in the English language.

FIELD OF THE INVENTION

The invention relates to an exhaust post-treatment device for a vehicle and a method for post-treatment of exhaust gases from vehicles.

BACKGROUND TO THE INVENTION AND PRIOR ART

In diesel vehicles, particularly in heavy vehicles such as heavy trucks, the SCR method, i.e. a method for selective reduction of nitrogen oxides, is used to clean the vehicle's exhaust gases so that those released into the surroundings do not contain high contents of nitrogen oxides.

In the SCR method, a liquid urea solution injected into the exhaust pipe may be used as $NO_x$ reducing agent.

Using liquid urea solution may entail problems at low exhaust temperatures in that the reducing agent injected does not become vaporised quickly enough, with consequent formation in the exhaust system of deposits which may lead to pressure drop. This presents a problem which is solved by maintaining such a high exhaust temperature that the reducing agent injected becomes vaporised in the exhaust pipe.

EP 2 078 834 A refers to a method and a system for cleaning of exhaust gases at such a high exhaust temperature that an additive becomes gasified such that the exhaust gases are warmed to shorten the time required before injection of liquid additive can commence, which involves using a great deal of energy.

US 2005/0204733 A1 refers to a device in which a thermoelectric element is used to generate electrical energy.

In the SCR method, gaseous ammonia injected into the exhaust pipe may also be used as reducing agent. Using a gaseous reducing agent reduces problems due to deposits of reducing agent in the exhaust pipe, since they only occur if the exhaust temperature before the exhaust gases reach the catalyst falls so low that the reducing agent is converted from gas to liquid or solid.

DE 10 2007 058 768 A1 refers to a device and a method for post-treatment of exhaust gases whereby gaseous reducing agent, e.g. ammonia, is injected into the exhaust pipe, and energy present in the exhaust gases is used to vaporise the reducing agent before it is injected in the exhaust pipe.

SUMMARY OF THE INVENTION

The object of the present invention is to propose an exhaust post-treatment device for a vehicle and a method for post-treatment of exhaust gases from vehicles, which device can operate even if the temperature of the exhaust gases is low.

The above object is achieved according to the invention by an exhaust post-treatment device according to the invention and a method for post-treatment of exhaust gases from vehicles according to the invention. An exhaust post-treatment device for a vehicle, which is adapted to reducing nitrogen oxides present in the vehicle's exhaust gases by supplying liquid reducing agent to the exhaust gases is placed in an exhaust pipe. The device comprises a Peltier element and is adapted to locally warming a surface within the exhaust pipe by means of a Peltier element by using thermal energy from the exhaust gases to vaporise liquid reducing agent which reaches the surface. A method for post-treatment of exhaust gases from vehicles by supplying liquid reducing agent to the exhaust gases in an exhaust pipe in order to reduce nitrogen oxides present in the gases, presents the characteristic of locally warming a surface within the exhaust pipe using an exhaust post-treatment device comprising a Peltier element. This uses thermal energy from the exhaust gases to vaporise liquid reducing agent which reaches the surface. The device and method achieve the advantage that formation of deposits of reducing agent within the exhaust pipe is avoided even if the temperature of the exhaust gases is low. A further advantage is that the Peltier element has no movable parts and a consequent robust configuration.

According to an embodiment of the invention, one side of the Peltier element is adapted to diverting thermal energy from the exhaust gases to the Peltier element by the energy being absorbed on one side of the Peltier element. The other side of the Peltier element is adapted to locally warming a surface within the exhaust pipe by thermal energy being delivered from the Peltier element to the surface within the exhaust pipe, thereby achieving the advantage that the exhaust post-treatment device needs only moderate amounts of energy for its operation.

According to a further embodiment of the invention, the Peltier element comprises at least two electrodes made of different semiconductive metals such that every other or second electrode is of N type and the alternate electrodes are of P type. The electrodes are arranged to extend from one side of the Peltier element to the other side of the Peltier element and are connected in series via conductors to a direct-current source. Closing the electric circuit causes electrons in the N type electrode to move in the opposite direction to the current, and holes in the P type electrode to move in the direction of the current. Both of them divert heat from one side of the Peltier element to the other side of the Peltier element, thereby achieving the advantage that the configuration of the exhaust post-treatment device is adaptable, e.g. depending on the desired effect of the Peltier element.

According to further embodiments of the invention, the thermal energy absorption side of the Peltier element may be situated at least partly within the exhaust pipe or adjacent to the outside of the exhaust pipe. The thermal energy absorption side of the Peltier element may be situated downstream or upstream of the supply device for supply of liquid reducing agent to the exhaust gases in the exhaust pipe, as seen in their direction of flow. The thermal energy delivery side of the Peltier element may be situated adjacent to the outside of the exhaust pipe or at least partly within the exhaust pipe. The surface which is locally warmed within the exhaust pipe may be a surface of the thermal energy delivery side of the Peltier element which is situated within the exhaust pipe, or a surface on the inside of the exhaust pipe. A catalyst may be provided in the exhaust pipe downstream of the supply device for the liquid reducing agent, as seen in the direction of flow of the exhaust gases. A control unit may be provided to control the Peltier element and the supply of liquid reducing agent, thereby achieving the advantage that the configuration of the exhaust post-treatment device is adaptable, e.g. depending on whether high efficiency or simple configuration and easy assembly is prioritised.

According to a further embodiment of the invention, the thermal energy absorption side of the Peltier element may be warmed by the exhaust gases,
direct current may be applied across the Peltier element, and
thermal energy may be delivered to the surface within the exhaust pipe from the thermal energy delivery side of the Peltier element,
thereby achieving the advantage that the exhaust post-treatment device needs only moderate amounts of energy for its operation.

BRIEF DESCRIPTION OF THE DRAWINGS

The invention is explained below in more detail with reference to the attached drawings, in which.

DESCRIPTION OF PREFERRED EMBODIMENTS OF THE INVENTION

Figure 1:
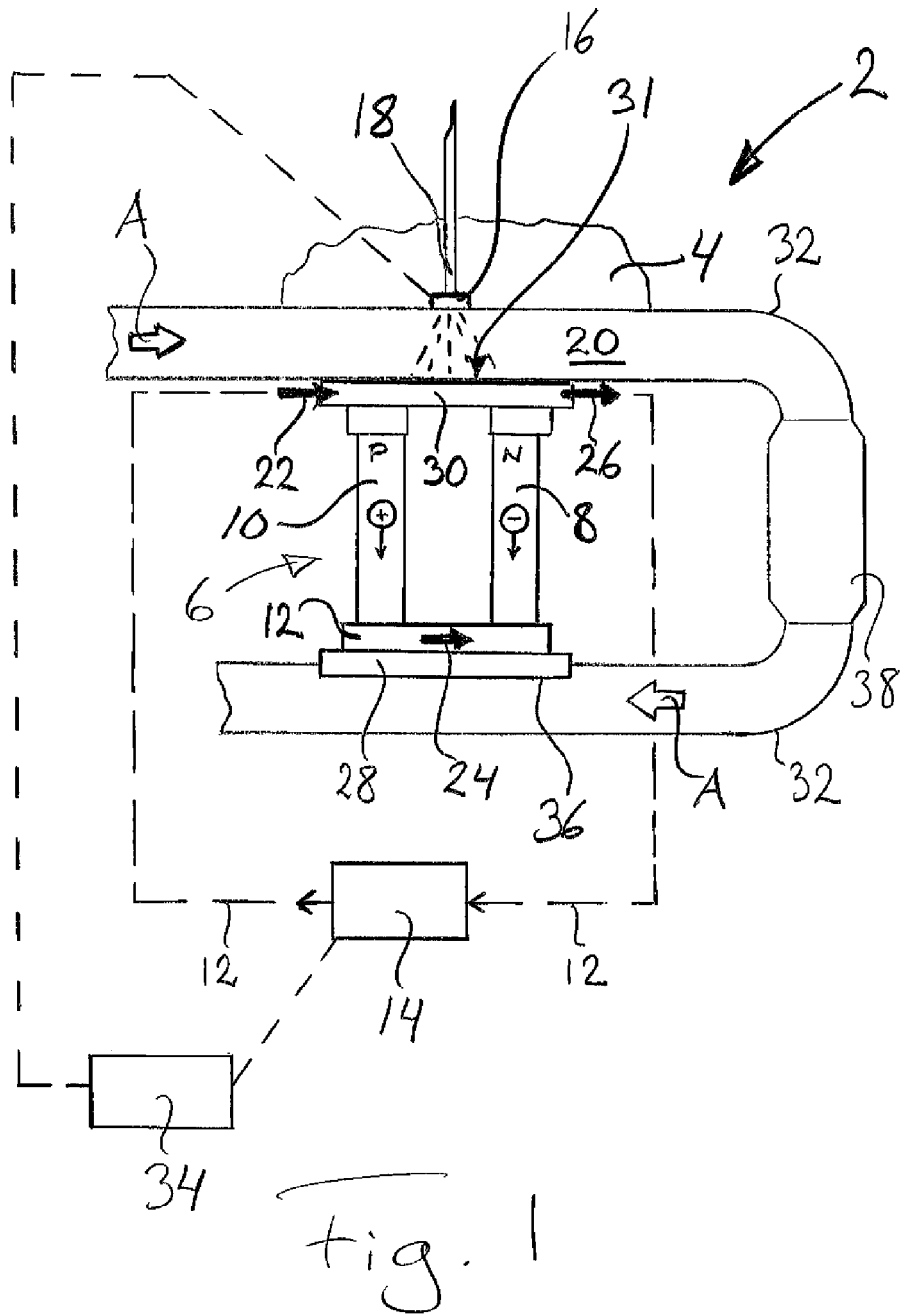
FIG. 1 depicts schematically an exhaust post-treatment device according to a first embodiment of the invention.

FIG. 1 depicts schematically an exhaust post-treatment device 2 for a vehicle 4 according to a first embodiment of the invention, which device 2 comprises a Peltier element 6 also called a thermoelectric cooling element. The Peltier element 6 itself comprises at least one "thermocouple" composed of two electrodes 8, 10 made of different semiconductive metals. Every second electrode 8 is of N type and the alternate electrodes 10 are of P type. The electrodes 8, 10 are arranged to extend from one side 28 of the Peltier element 6 to the other side 30 of the Peltier element. The electrodes are connected in series via conductors 12, preferably made of copper, to a direct-current source 14, such that closing the electric circuit causes electrons in the N type electrode to move in an opposite direction to the current, and holes in the P type electrode to move in the direction of the current, as illustrated in the diagram, both of them diverting heat from one side 28 of the Peltier element 6 to the other side 30 of the Peltier element 6. Applying a direct current to the electrodes 8, 10 in the direction of the arrows 22, 24, 26 causes thermoelectric effects in the Peltier element 6 which result in thermal energy being absorbed on one side 28 of the Peltier element 6 and being delivered on the other side 30 of the Peltier element 6, i.e. the Peltier element 6 has a heat absorption side 28 and a heat delivery side 30.

The exhaust post-treatment device 2 comprises also a supply device 16 for supply to the exhaust gases 20 of liquid reducing agent 18 which is intended for reduction of nitrogen oxides present in the exhaust gases 20.

Connecting in series a number of "thermocouples" in a chain of alternate N type and P type electrodes results in a more powerful Peltier element.

The Peltier element 6 is thus adapted to diverting thermal energy from the exhaust gases 20 and to thereby locally warming a surface 31 which according to this embodiment is part of the inside wall of an exhaust pipe 32 by diverting thermal energy from the Peltier element 6 to the surface 31 within the exhaust pipe 32.

Thus the exhaust post-treatment device 2 is adapted to reducing nitrogen oxides present in the exhaust gases 20 of the vehicle 4 by supplying liquid reducing agent 18 to the exhaust gases 20 in an exhaust pipe 32, and to locally warming a surface 31 within the exhaust pipe 32 by means of a Peltier element 6 by using thermal energy from the exhaust gases 20 to vaporise liquid reducing agent 18 which reaches the surface 31, and thereby prevent formation of deposits of reducing agent within the exhaust pipe.

Using a heat pump as above makes it possible to increase the temperature locally on the surface 31 within the exhaust pipe 32 where liquid reducing agent 18 is supplied, e.g. by being injected, so that vaporisation of the reducing agent 18 can take place.

The liquid reducing agent 18 is an $NO_x$ reducing agent, e.g. a liquid $NO_x$ reducing agent such as a liquid urea solution, e.g. the additive marketed under the trade name "Ad Blue" which contains 32.5 wt % of urea in distilled/deionised water.

Where a liquid urea solution is used, the surface 31 in the exhaust pipe 32 needs to be kept at a temperature of at least about 200° C. for vaporisation to be assured.

Supplying a liquid urea solution in the exhaust pipe with exhaust gases at temperatures over 180° C. causes the water to boil away, followed by the urea melting and becoming vaporised by so-called thermolysis. This stage involves formation inter alia of ammonia by the reaction $$(NH_2)_2CO => NH_3 + HNCO.$$

After the thermolysis of the urea, hydrolysis takes place in a downstream catalyst or at a temperature over 400° C. by the reaction $$HNCO + H_2O => NH_3 + CO_2.$$

$NH_3$ reduces $NO_x$ by the reaction $$NH_3 + NO_x => N_2 + H_2O \text{ (unbalanced formula in that } x \text{ may have various different values).}$$

Recondensation of ammonia takes place at about −30° C., so this is not a major problem in a vehicle exhaust pipe during operation.

At least one control unit 34 is preferably provided to control the Peltier element 6 and the supply of liquid reducing agent 18, depending on which reducing agent is used and on the temperature of the exhaust gases in the exhaust pipe 32, so that these activities only take place when necessary. If the Peltier element 6 and the supply of liquid reducing agent 18 are controlled by separate control units, the latter have to be synchronised such that the control unit for controlling the Peltier element 6 preferably serves as a "slave unit" to the control unit for controlling the supply of liquid reducing agent 18. If the exhaust gases 20 are very cold, e.g. just after a cold start at very low outside temperatures, it may be impossible for the reducing agent to become gasified despite local warming of a surface 31 in the exhaust pipe 32 by the Peltier element 6, in which case the control unit 34 will block the supply of liquid reducing agent 18 in the exhaust pipe 32. Similarly, if the exhaust gases 20 are very warm, i.e. warmer than 400° C., the liquid reducing agent 18 will become gasified without need for a surface 31 in the exhaust pipe 32 to be warmed locally as above, in which case the control unit 34 will block operation of the Peltier element 6. The control unit 34 will ensure that reducing agent 18 is supplied to the exhaust gases 20 and that the Peltier element 6 is in operation if the exhaust temperature is so high that the reducing agent 18 which does not reach the surface 31 within the exhaust pipe 32 can become gasified, but not so high that the reducing agent 18 which reaches, and thereby cools, a surface 31 within the exhaust pipe 32 also becomes gasified. This temperature range may be set by the control unit 34, depending on which reducing agent is used. The exhaust temperature has to be high enough for the reducing agent 18 which does not reach a surface 31 within the exhaust pipe 32 to become gasified, which temperature is different for different reducing agents 18. The exhaust temperature required for liquid $NO_x$ reducing agent which reaches and thereby cools a surface 31 within the exhaust pipe 32 to nevertheless become gasified depends on various factors such as the temperature of the liquid reducing agent at the time of supply, the dimensions of the exhaust pipe, the velocity of the exhaust flow, the size of the area reached by liquid reducing agent, etc. The exhaust gases may normally be at a temperature of between about 200° C. and about 700° C. during operation.

It is also possible to use the exhaust post-treatment device without a control unit, but in that case deposits will form on the inside surface of the exhaust pipe and subsequently burn away when the temperature rises, and the Peltier element will be run even when not required for the gasification of urea, so a device with no control unit is not advisable.

According to this embodiment, the heat absorption side 28 of the Peltier element 6 is situated within an exhaust pipe 32, so warm exhaust gases 20 pass a surface 36 of the heat absorption side 28 of the Peltier element 6, leading to warming of the heat absorption side 28 of the Peltier element 6.

The exhaust post-treatment device 2 according to this embodiment works according to the following principle during operation of the Peltier element 6, based on the example of using a liquid urea solution as reducing agent.

The heat delivery side 30 of the Peltier element 6 according to this embodiment is situated adjacent to the wall of the exhaust pipe 32 where there is risk of deposits, i.e. preferably adjacent to the region where the liquid reducing agent 18 from the supply device 16 reaches the inside surface of the exhaust pipe, e.g. centrally to the supply device 16 for liquid reducing agent, where the heat delivery side 30 of the Peltier element 6 delivers thermal energy to a surface 31 within the exhaust pipe 32, in this case to the wall of the exhaust pipe, and thereby locally warms the inside surface of the exhaust pipe as a result of the heat delivery side 30 of the Peltier element 6 being in thermal contact with the exhaust pipe 32.

The aforesaid method makes it possible for the thermal energy present in the exhaust gases to be utilised, despite the exhaust temperature being only moderate, e.g. about 100-300° C., to substantially completely gasify the reducing agent 18. Without the local warming described above of a surface 31 within the exhaust pipe 32, moderate exhaust temperatures might cause parts of the reducing agent reaching this surface 31 to solidify, potentially causing deposits and consequent pressure drop in the exhaust system. Increasing pressure drop may preferably be used to detect build-up of deposits. Such deposits certainly burn away if the exhaust temperature thereafter becomes very high, but on long runs at low load and steady speed, e.g. when driving an unladen vehicle combination in flat terrain, the exhaust temperature will remain at low levels for long periods, potentially leading to deposits. Warming instead the whole exhaust flow, e.g. by electricity or diesel fuel or heat pump, would consume a great deal more energy than the aforesaid utilisation of the thermal energy present in the exhaust gases.

Preferably, a catalyst 38 is provided in the exhaust pipe 32 downstream of the supply device 16 for the liquid reducing agent 18, to ensure that not only thermolysis of urea but also hydrolysis as above takes place. The diagram shows the catalyst 38 upstream of the heat absorption side 28 of the Peltier element 6 but it may also be situated downstream of the heat absorption side 28 of the Peltier element 6, with respect in either case to the exhaust flow direction A in the exhaust pipe 32. Alternatively, the exhaust post-treatment device may be used with no catalyst, but this is not advisable because it might lead to periodic build-up of deposits.

Figure 2:
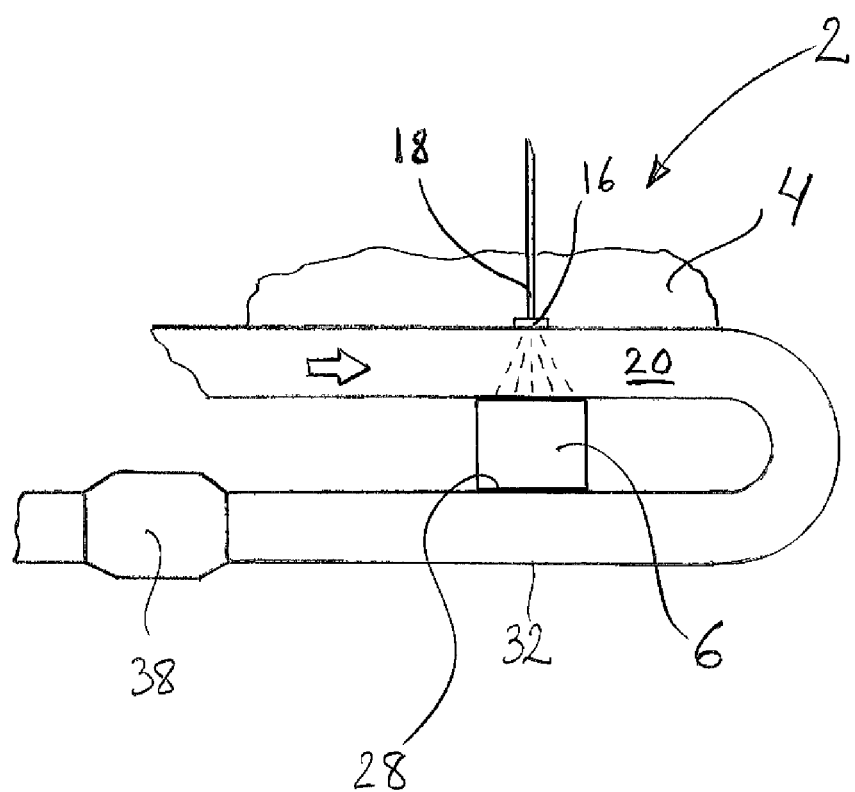
FIG. 2 depicts schematically an exhaust post-treatment device according to a second embodiment of the invention.

FIG. 2 depicts schematically an exhaust post-treatment device 2 for a vehicle 4 according to a second embodiment of the invention, which device 2 comprises a Peltier element 6. The device 2 comprises also a supply device 16 for supply to the exhaust gases 20 of liquid reducing agent 18 intended for reduction of nitrogen oxides present in them.

The embodiment depicted in FIG. 2 differs from that described with reference to FIG. 1 in that in this case the heat absorption side 28 of the Peltier element 6 is adjacent to the outside of an exhaust pipe 32, and that a possible catalyst 38 is provided downstream of the heat absorption side 28 of the Peltier element 6. The catalyst 38 may however also be situated upstream of the heat absorption side 28 of the Peltier element 6, as in FIG. 1, or alternatively the exhaust post-treatment device may be used with no catalyst. In other respects, the description with respect to FIG. 1 applies also, e.g. as regards a possible control unit, in FIG. 2.

Figure 3:
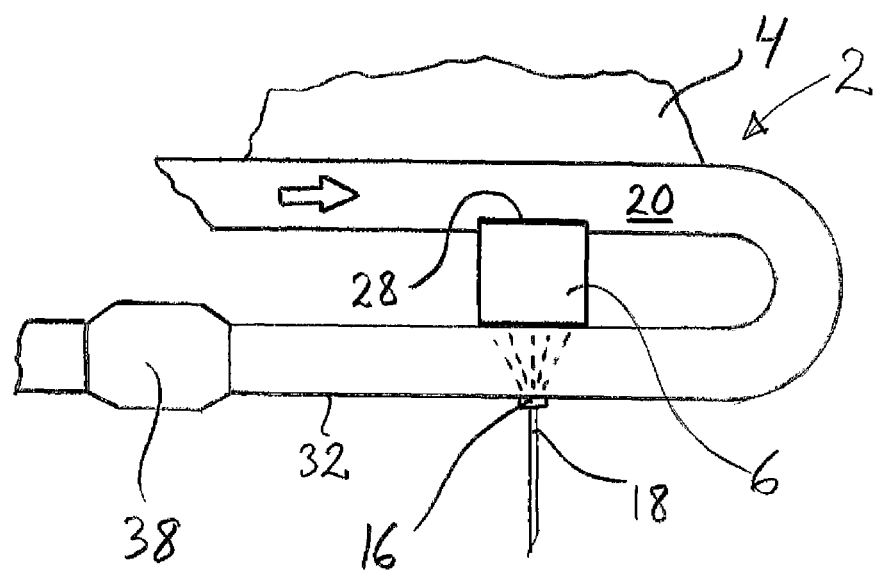
FIG. 3 depicts schematically an exhaust post-treatment device according to a third embodiment of the invention.

FIG. 3 depicts schematically an exhaust post-treatment device 2 for a vehicle 4 according to a third embodiment of the invention, which device 2 comprises a Peltier element 6. The device 2 likewise comprises a supply device 16 for supply to the exhaust gases 20 of liquid reducing agent 18 intended for reduction of nitrogen oxides present in them.

The embodiment depicted in FIG. 3 differs from that described with respect to FIG. 1 in that in this case the heat absorption side 28 of the Peltier element 6 is upstream of the supply device 16 for supply of liquid reducing agent 18 to the exhaust gases 20. In other respects, the description with respect to FIG. 1 applies also, e.g. as regards a possible control unit, to the embodiment depicted in FIG. 2 but any catalyst 38 has to be situated downstream of the supply device 16 for supply of liquid reducing agent 18 to the exhaust gases 20.

Figure 4:
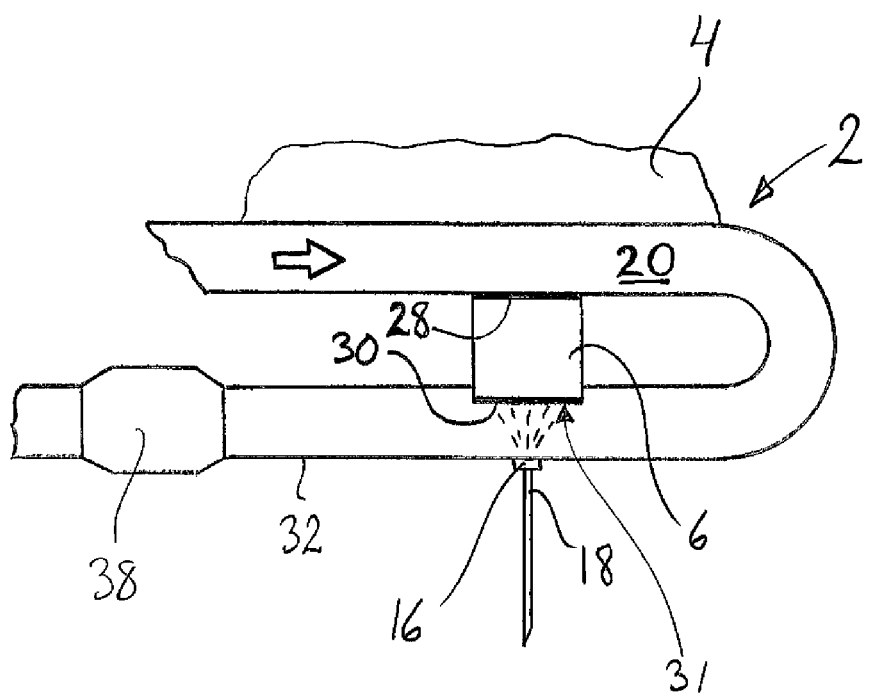
FIG. 4 depicts schematically an exhaust post-treatment device according to a fourth embodiment of the invention.

FIG. 4 depicts schematically an exhaust post-treatment device 2 for a vehicle 4 according to a fourth embodiment of the invention, which device 2 comprises a Peltier element 6. The device 2 likewise comprises a supply device 16 for supply to the exhaust gases 20 of liquid reducing agent 18 intended for reduction of nitrogen oxides present in them.

The embodiment depicted in FIG. 4 differs from that described with respect to FIG. 1 in that in this case the heat absorption side 28 of the Peltier element 6 is upstream of its heat delivery side 30 and is adjacent to the outside of an exhaust pipe 32. This embodiment further differs from that described with respect to FIG. 1 in that the heat delivery side 30 of the Peltier element 6 is at least partly situated within an exhaust pipe 32 so that it has within the exhaust pipe 32 a surface 31 which is warmed locally. In other respects, the description with respect to FIG. 1 applies also, e.g. as regards a possible control unit, to the embodiment depicted in FIG. 2 but any catalyst 38 has to be situated downstream of the supply device 16 for supply of liquid reducing agent 18 to the exhaust gases 20.

The liquid reducing agent 18 is preferably kept warm enough not to freeze, which in the case of "Ad Blue" would take place at about −11° C.

Figure 5:
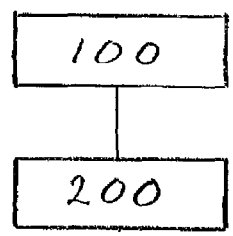
FIG. 5 is a schematic flowchart of a method according to an embodiment of the invention.
Figure 6:
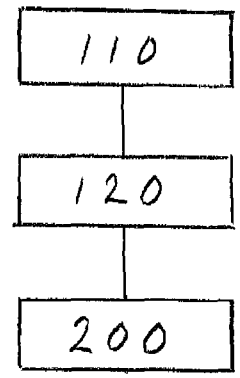
FIG. 6 is a schematic flowchart of a method according to a further embodiment of the invention.

FIGS. 5 and 6 illustrate examples of the method for post-treatment of exhaust gases.

FIG. 5 is a schematic flowchart of a method according to an embodiment of the invention, and the reference notations 2, 4, 18, 20, 31, 32 used here are those of FIGS. 1-4. The method for post-treatment of exhaust gases from vehicles by 100 supplying liquid reducing agent 18 to the exhaust gases 20 in an exhaust pipe 32 in order thereby to reduce nitrogen oxides present in the exhaust gases 20 of the vehicle 4. The method comprises also the step of 200 locally warming a surface 31 within the exhaust pipe 32 with an exhaust post-treatment device 2 comprising a Peltier element 6 by using thermal energy from the exhaust gases 20 to vaporise liquid reducing agent 18 which reaches the surface 31, and thereby prevent formation of deposits of reducing agent within the exhaust pipe.

FIG. 6 is a schematic flowchart of a method according to a further embodiment of the invention, and the reference notations 6, 20, 28, 30, 31, 32 used here are those of FIGS. 1-4. The embodiment in FIG. 6 comprises not only the steps of FIG. 5 but also those of using the exhaust gases 20 to warm 110 the heat absorption side 28 of the Peltier element 6, 120 applying a direct current across the Peltier element 6, and 200 delivering thermal energy to the surface 31 within the exhaust pipe 32 from the heat delivery side 30 of the Peltier element 6.

The invention is in no way restricted to the embodiments described but may be varied freely within the scopes of the claims. Parts from the various embodiments may be combined. The heat absorption side 28 of the Peltier element 6 may thus be situated adjacent to the outside of the exhaust pipe 32 or at least partly within the exhaust pipe 32. The absorption side 28 of the Peltier element 6 may thus be situated either downstream or upstream of the supply device 16 for supply of liquid reducing agent 18 to the exhaust gases 20 in the exhaust pipe 32, as seen in their direction of flow, but a downstream location is advisable purely functionally in that having the heat absorption side 28 of the Peltier element 6 downstream of the supply device 16 for supply of liquid reducing agent 18 means that energy is only absorbed from the exhaust gases 20 after the supply of liquid reducing agent 18 to the exhaust gases 20, thereby avoiding a corresponding lowering of the exhaust temperature before supply of liquid reducing agent 18, which would be disadvantageous for its vaporisation. The heat delivery side 30 of the Peltier element 6 might thus be situated either adjacent to the outside of the exhaust pipe 32 or at least partly within the exhaust pipe 32. The surface 31 which is warmed might thus be part of the inside of the exhaust pipe 32 or be a surface of the heat delivery side 30 of the Peltier element 6 which is situated within the exhaust pipe 32 or be some other surface within the exhaust pipe which is in thermally conductive contact with the heat delivery side 30 of the Peltier element 6.

The invention claimed is:

1. An exhaust post-treatment device for a vehicle for reducing nitrogen oxides present in exhaust gases of the vehicle by supply of liquid reducing agent to the exhaust gases in an exhaust pipe, the device comprising:
    a Peltier element for diverting thermal energy from the exhaust gases, the Peltier element having one side configured and located to absorb thermal energy from the exhaust gases in the exhaust pipe at a first location along the exhaust pipe, the Peltier element having another side configured to locally warm a surface at a second location along the exhaust pipe within the exhaust pipe by delivering thermal energy from the one side of Peltier element to the another side of the Peltier element to vaporise liquid reducing agent which reaches the surface, thereby avoiding formation of deposits of reducing agent inside the exhaust pipe; and
    the Peltier element is connected to a direct-current source which causes the Peltier element to divert heat from the one side of the Peltier element to the other side of the Peltier element.

2. The exhaust post-treatment device according to claim 1, wherein the Peltier element comprises:
    at least two electrodes configured of different semiconductive metals, and every second electrode being of N type and the alternate electrodes being of P type, the electrodes extend from one side of the Peltier element to the other side of the Peltier element, conductors connect the electrodes in series to the direct-current source such that closing an electrical circuit including the conductors causes electrons in the N type electrode to move in an opposite direction to the current, and causes holes in the P type electrode to move in the direction of the current, whereby both movements of the electrodes divert heat from the one side of the Peltier element to the other side of the Peltier element.

3. The exhaust post-treatment device according to claim 1, wherein the liquid reducing agent is a liquid urea solution.

4. The exhaust post-treatment device according to claim 1, wherein the thermal energy absorption side of the Peltier element is situated at least partly within the exhaust pipe.

5. The exhaust post-treatment device according to claim 1, wherein the exhaust pipe has an inside and an outside; and
    the thermal energy absorption side of the Peltier element is situated adjacent to the outside of the exhaust pipe.

6. The exhaust post-treatment device according to claim 1, further comprising a supply device for supplying the liquid reducing agent into the exhaust pipe; and
    the thermal energy absorption side of the Peltier element is situated either downstream or upstream of the supply device for supply of liquid reducing agent to the exhaust gases in the exhaust pipe, as seen in a flow direction of the exhaust gases.

7. The exhaust post-treatment device according to claim 1, wherein the exhaust pipe has an inside and an outside; and
    the thermal energy delivery side of the Peltier element is situated adjacent to the outside of the exhaust pipe.

8. The exhaust post-treatment device according to claim 1, wherein the thermal energy delivery side of the Peltier element is situated at least partly within the exhaust pipe.

9. The exhaust post-treatment device according to claim 8, wherein a surface of the thermal energy delivery side of the Peltier element is situated within the exhaust pipe and is configured and located to be locally warmed within the exhaust pipe.

10. The exhaust post-treatment device according to claim 1, further comprising a catalyst provided in the exhaust pipe and downstream of the supply device for supply of liquid reducing agent, as seen in the direction of flow of the exhaust gases.

11. The exhaust post-treatment device according to claim 1, further comprising at least one control unit configured to control the Peltier element and the supply of liquid reducing agent.

12. A method for post-treatment of exhaust gases of a vehicle comprising:
    supplying liquid reducing agent to the exhaust gases in an exhaust pipe of the vehicle in order to reduce nitrogen oxides present in the exhaust gases of the vehicle;

warming a thermal energy absorption side of a Peltier element with heat from exhaust gases in the exhaust pipe;

transferring heat to a heat delivery side of the Peltier device;

locally warming a surface within the exhaust pipe with the heat delivery side of the Peltier element to vaporise the liquid reducing agent which reaches the surface, thereby avoiding formation of deposits of reducing agent within the exhaust pipe; and applying a direct current across the Peltier element for delivering thermal energy to a surface within the exhaust pipe from the thermal energy delivery side of the Peltier element.

* * * * *